United States Patent [19]

Kehl

[11] Patent Number: 4,490,816
[45] Date of Patent: Dec. 25, 1984

[54] TONEARM ALIGNMENT GAUGE

[75] Inventor: Joseph D. Kehl, Chicago, Ill.

[73] Assignee: Shure Brothers, Inc., Evanston, Ill.

[21] Appl. No.: 424,081

[22] Filed: Sep. 27, 1982

[51] Int. Cl.³ .............................................. G11B 3/10
[52] U.S. Cl. ................................. 369/55; 33/180 R
[58] Field of Search ........................... 369/55, 56, 57; 33/180 R

[56] References Cited

U.S. PATENT DOCUMENTS

| | | | |
|---|---|---|---|
| 3,283,411 | 11/1966 | Steward | 33/180 R |
| 3,493,234 | 2/1970 | Voss et al. | 369/55 |
| 4,295,277 | 10/1981 | Dennesen et al. | 369/55 |
| 4,326,283 | 4/1982 | Towlan et al. | 369/55 |
| 4,351,045 | 9/1982 | Townshend | 369/55 |
| 4,368,527 | 1/1983 | Goldstein | 369/55 |
| 4,423,499 | 12/1983 | Peschel | 369/55 |

OTHER PUBLICATIONS

B. V. Pisha, "Dennesen Geometric Sountracktor and Vertical Tracking Angle Gauge", Audio, Mar. 1980.
John Borwick, "An Aid to Cartridge Installation," Grammophone, Apr. 1981.
"Dennesen Soundtractor," A Homemade Alignment Protractor, DB Systems DBP—10 Alignment Gauge, Stereophile, Aug. 1980.
H. G. Baerwald, "Analytic Treatment of Tracking Error and Notes on Optimal Pick—Up Design", Journal of the Society of Motion Picture Engineers, vol. 37, pp. 591-622, Dec. 1941.
R. J. Gilson, "The Cartridge Alignment Problem", Wireless World, Oct. 1981.
R. J. Gilson, "Cartridge Alignment Gauge", Wireless World, Nov. 1981.

Primary Examiner—Steven L. Stephan
Attorney, Agent, or Firm—Allegretti, Newitt, Witcoff & McAndrews

[57] ABSTRACT

A phonograph cartridge alignment gauge includes a plate, a cartridge work station and a visual indicator. A method of aligning a cartridge on a tone arm with the gauge, for stylus tangency at two radii, includes fastening the cartridge to the tone arm while the cartridge is on the work station and the turntable spindle is within a combination pivot point-spindle opening of the gauge, to establish stylus tangency at a first radii. The cartridge is refastened to the tone arm while the cartridge remains in the work station but after the tone arm is moved and the gauge pivoted about the combination opening, to establish stylus tangency at a second radii while maintaining tangency at the first. An alternate gauge and method include similar details.

9 Claims, 13 Drawing Figures

U.S. Patent  Dec. 25, 1984  Sheet 1 of 6  4,490,816
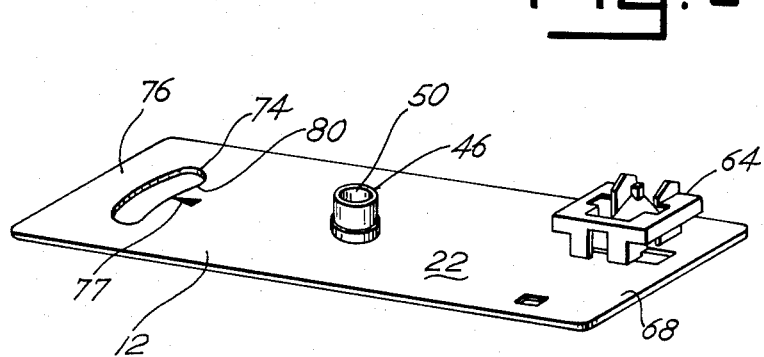
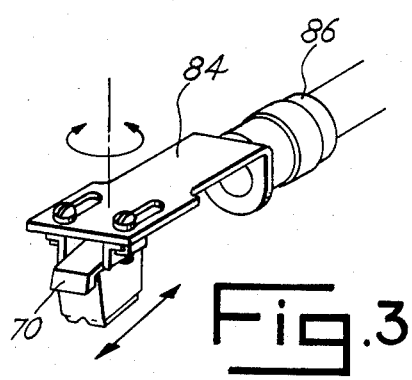
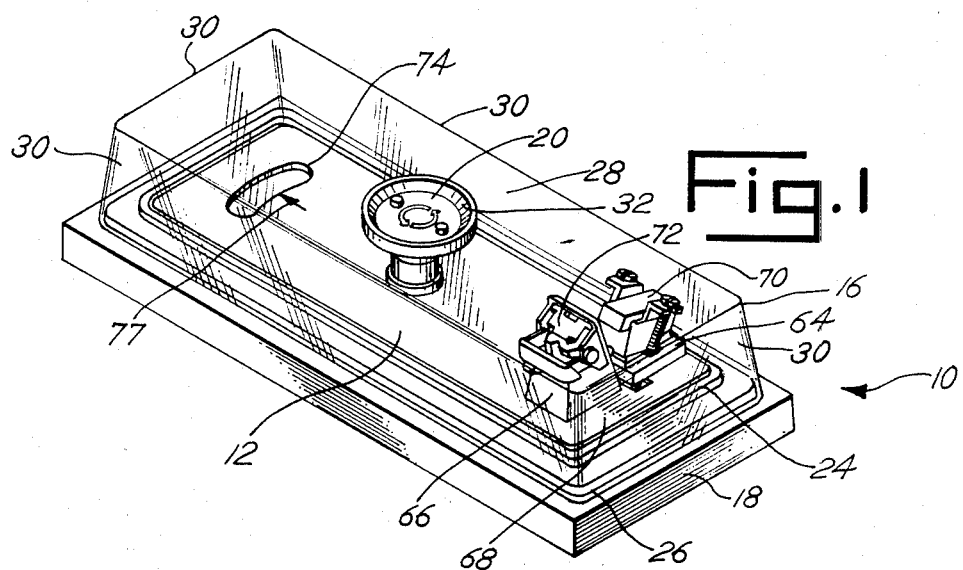
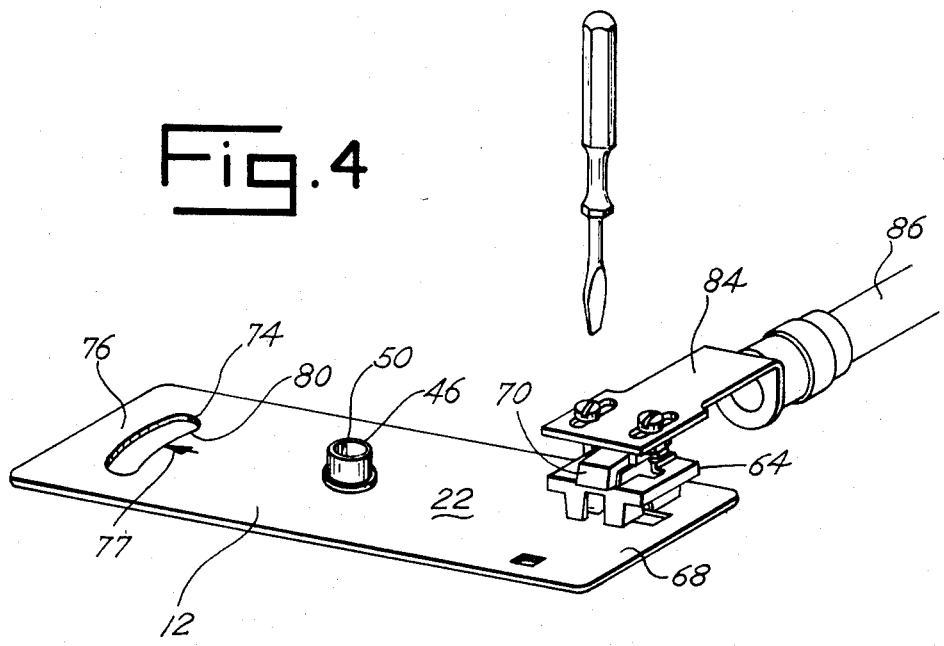

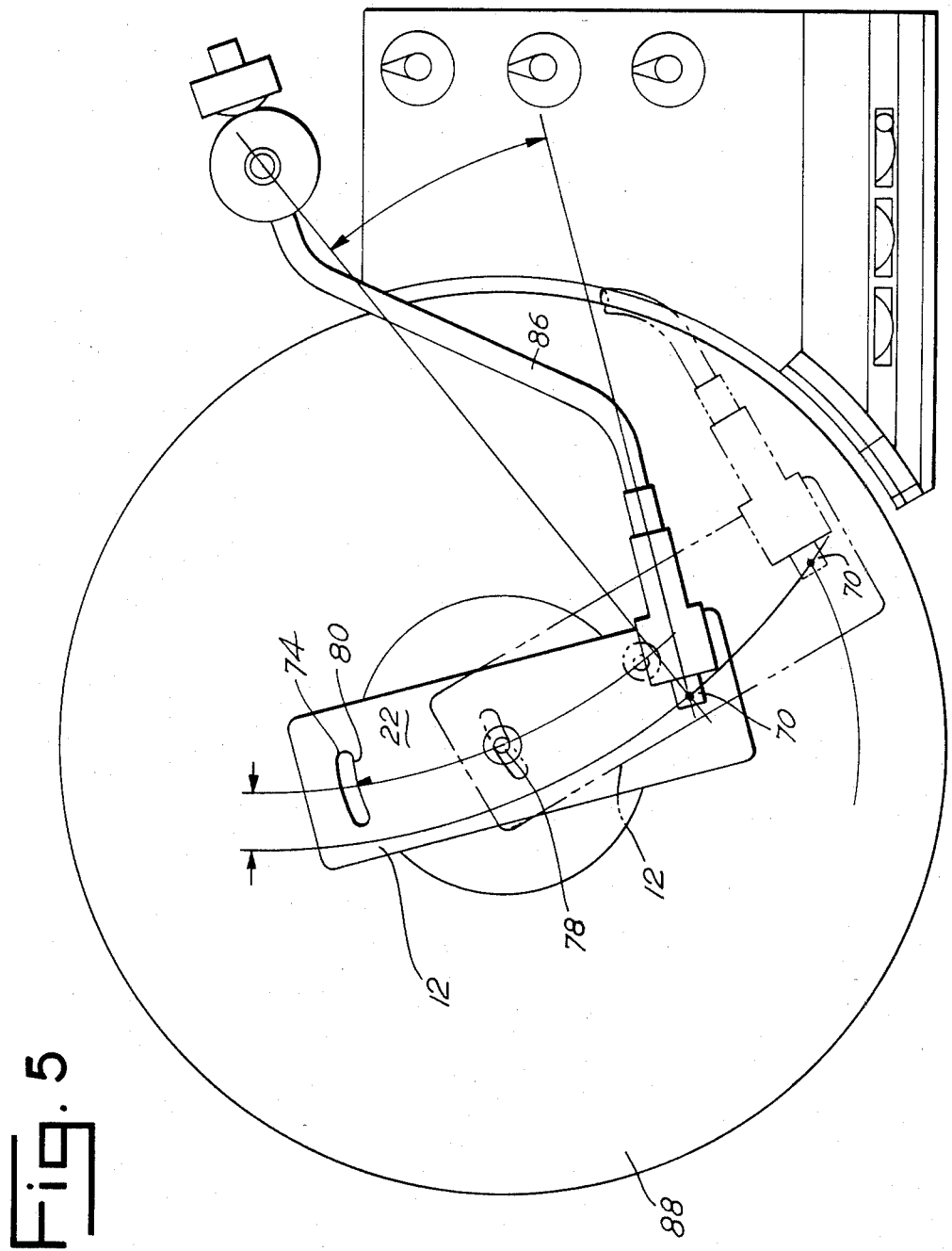

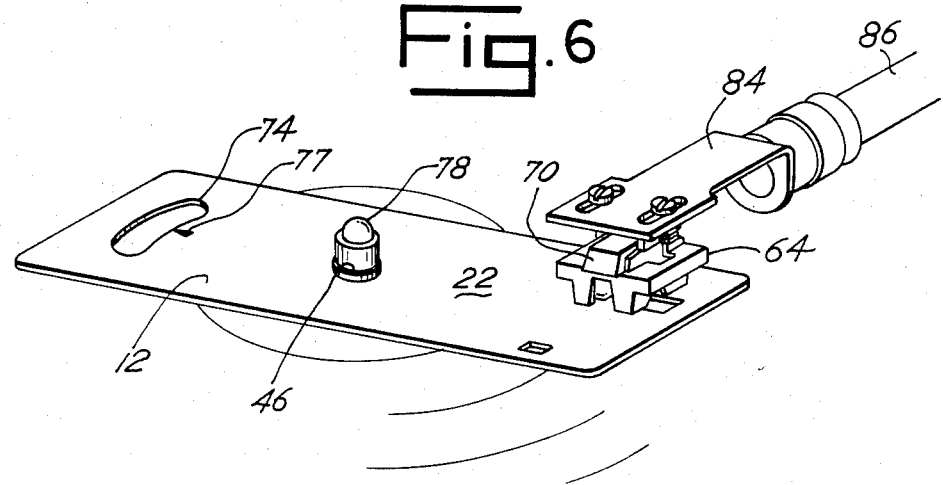
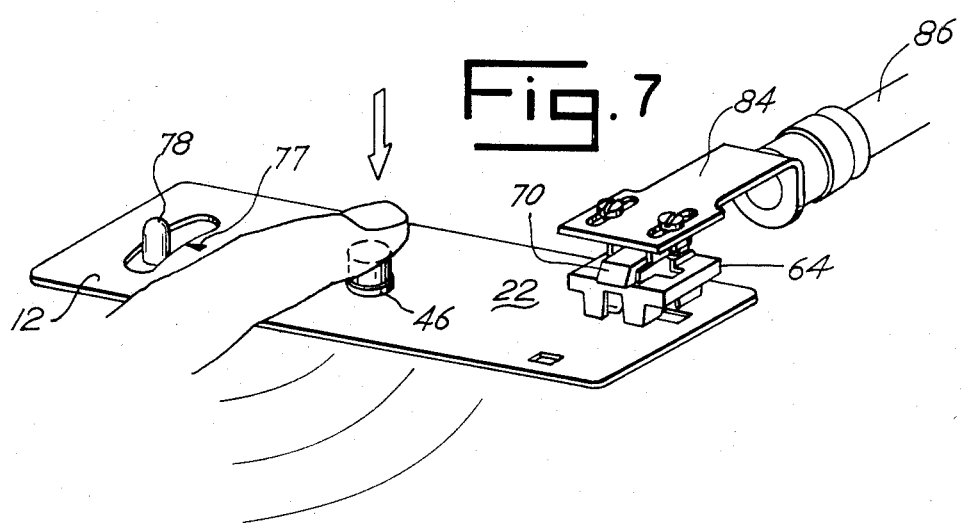
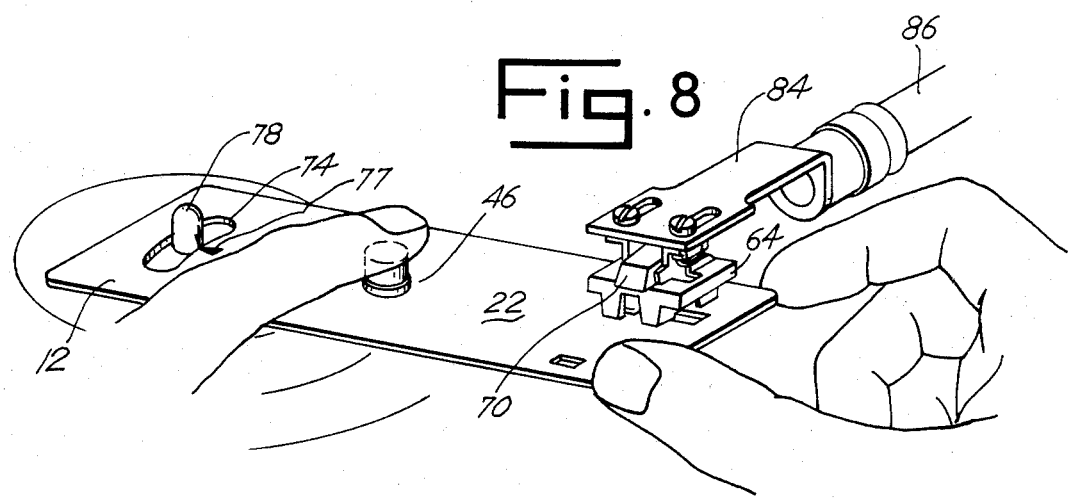

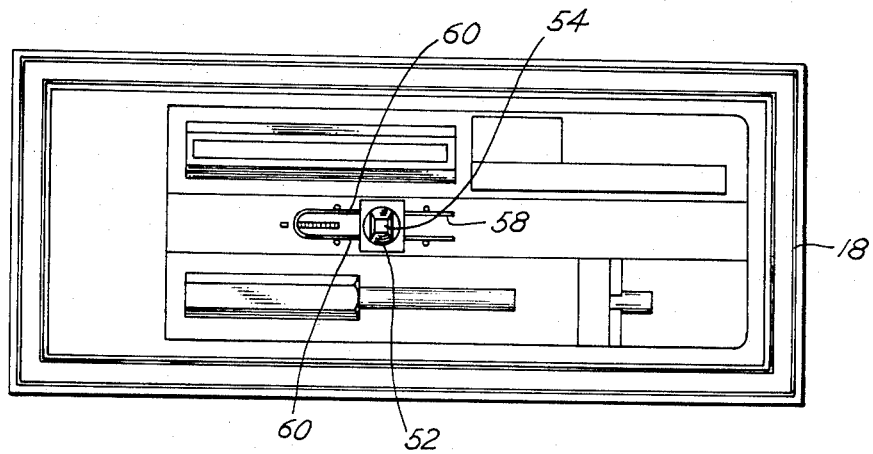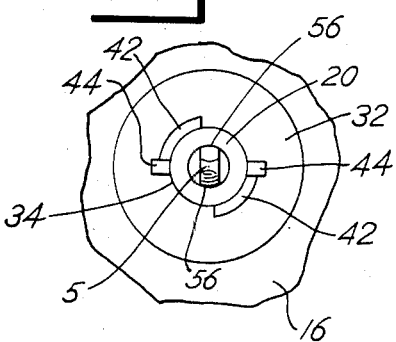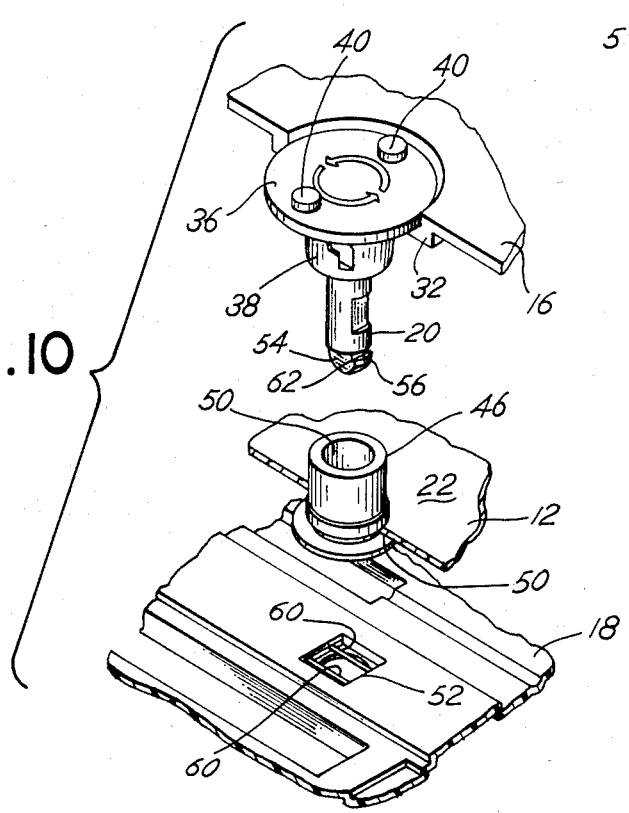

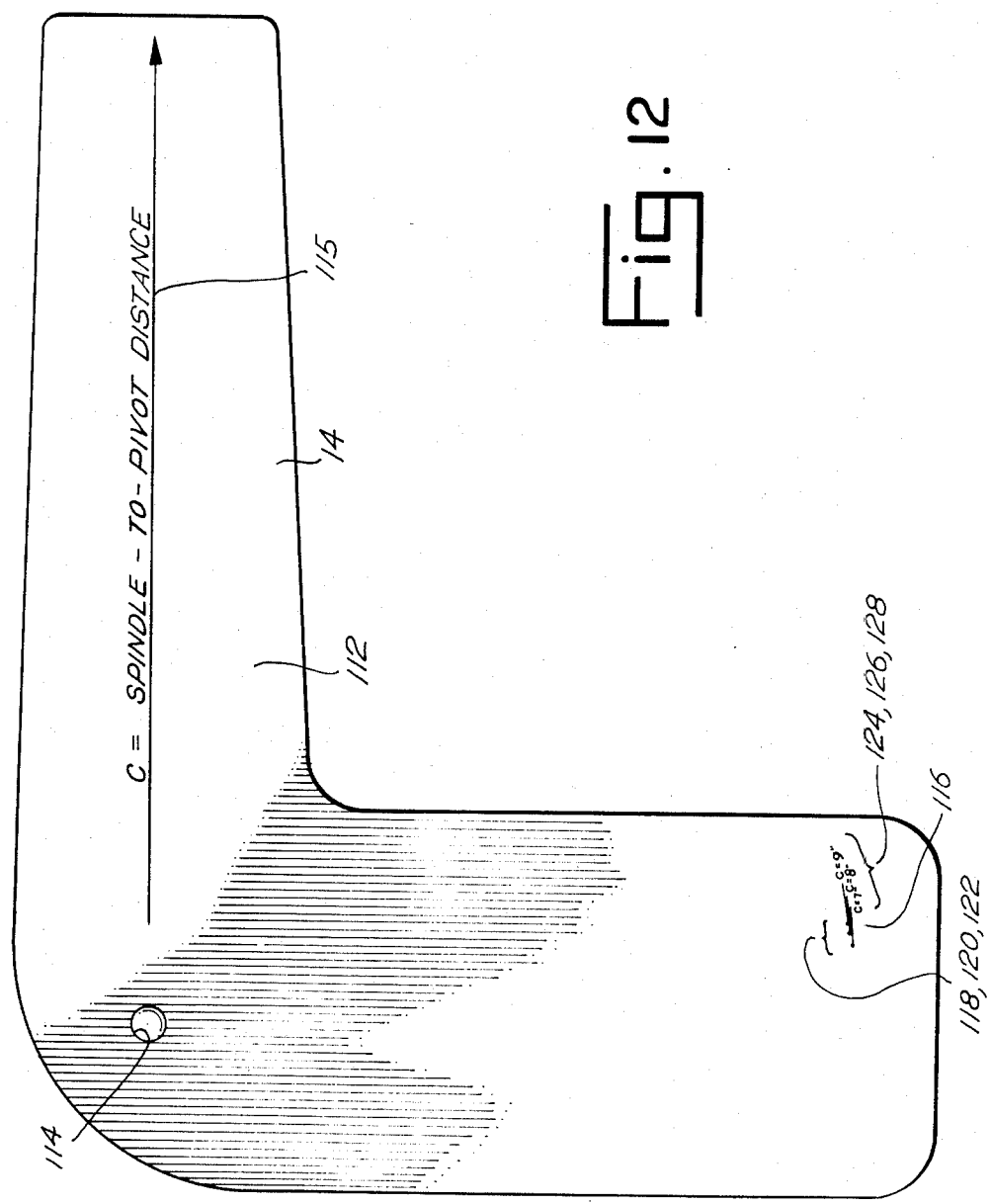

TONEARM ALIGNMENT GAUGE

BACKGROUND OF THE INVENTION

This invention relates to phonograph cartridges, phonograph tone arms, the alignment of such cartridges on such tone arms, and more particularly, to phonograph cartridge alignment gauges and methods of phonograph cartridge alignment.

A currently common phonograph for the reproduction of sound includes, in part, a phonograph record, a turntable, a stylus and cartridge assembly, and a tone arm. The turntable has a rotary platter with a central spindle for the mounting of phonograph records. The stylus and cartridge assembly has a cantilevered stylus removably mounted on the cartridge and electromagnetic components for (i) sensing fluctuations in the spiral groove traced upon the record and (ii) converting the sensations into a correspondingly-fluctuating electrical signal, from which sound can be generated electronically. The tone arm is elongated, pivotally mounted on the turntable adjacent the platter and has a headshell for mounting of the stylus and cartridge assembly on the tone arm.

It is generally accepted that for best sound quality in such a system, the cartridge and stylus assembly must be mounted on the tone arm to minimize weighted lateral tracking error. Such error varies with the distance or "radius" of the cartridge from the spindle. At any one distance, weighted lateral tracking error equals angular error divided by the distance. Current wisdom based on H. G. Baerwald, "Analytic Treatment of Tracking Error and Notes on Optimal Pick-Up Design," *Journal of the Society of Motion Picture Engineers,* Vol 37, pp. 591–622, Dec. 1941, is that weighted lateral tracking error is minimized if the cartridge is mounted such that its stylus is tangent to the record groove of a turntable-mounted phonograph record at the following two distances from the spindle: 2.60 inches (66.04 mm) and 4.76 inches (120.90 mm).

However, mounting the cartridge to minimize weighted lateral tracking error is difficult, and has even been called tricky. Some physical aids to cartridge mounting have been disclosed, but all known prior art devices are either quite expensive, or difficult to use, or both. Such devices are most often difficult to use because they require multiple adjustments of their parts and the cartridge on the tone arm, and to accomodate a given tone arm pivot-to-spindle distance, visual sighting of the stylus.

SUMMARY OF THE INVENTION

Thus, it is an object of this invention to provide a phonograph cartridge alignment gauge which overcomes the deficiencies of prior art alignment aids, and is inexpensive and easy to use.

Another object is to provide a gauge which requires a minimum number of adjustments of its parts and of the cartridge on the tone arm, and no visual sighting of the stylus.

Another object is to provide a gauge which does not even require that the stylus be mounted on the cartridge during alignment, so that there is no risk of damage to the delicate stylus and its mounting.

Other objects are to provide an alternative gauge and methods of alignment which are ingeniously simplified and yet extremely accurate as compared to prior art devices.

Still another object is to provide a sales case for a phonograph cartridge and stylus which has the invented alignment gauge as an integral part thereof.

Therefore, in a principal aspect, the invention is an improved phonograph cartridge alignment gauge. The gauge is for positioning a phonograph cartridge on a pivotally supported tone arm of a phonograph having a turntable with a central spindle. The mounting is accomplished, as preferred, such that the shank of a stylus normally mounted on the cartridge will be tangent to the groove of a record placed on the turntable platter at two preselected radii from the center of the spindle, to minimize weighted lateral tracking error. This minimization is achieved without regard to tone arm pivot-to-spindle distance. The gauge comprises a plate, a cartridge work station on the plate and an alignment means on the plate. The plate defines a combination pivot point-spindle opening and as preferred, an arc shaped spindle opening. The work station is adapted to receive the cartridge, and as preferred, to receive the cartridge without the stylus. The work station is positioned on the plate so that (i) a point representing the tip of a stylus normally mounted on the received cartridge is a first of the two preselected distances from the center of the combination pivot point-spindle opening and (ii) a first line representing the shank of the stylus normally mounted on the received cartridge is tangent to a second line defined by the point representing the stylus tip and the center of the combination pivot point-spindle opening. The alignment means provides for linear alignment of the point representing the stylus tip, the center of the combination pivot point-spindle opening and the center of the spindle, while the spindle is in the arc shaped spindle opening.

The use of this gauge and these and other principal aspects, objects and advantages of the invention will be described in full in the detailed description, which follows.

BRIEF DESCRIPTION OF THE DRAWING

The accompanying drawing includes thirteen figures. Each of these figures is briefly described as follows:

FIG. 1 is a perspective view of a preferred sales case which includes a transparent cover mounted on a base and locked thereon by a central locking key, and a preferred cartridge alignment gauge locked between the cover and base, with a new cartridge and new stylus mounted on the gauge;

FIG. 2 is a perspective view of the preferred gauge alone;

FIG. 3 is a perspective view of a cartridge loosely mounted on a tone arm headshell with its possible directions of movement relative to the headshell marked by arrows;

FIG. 4 is a perspective view of the preferred gauge with a tone arm mounted cartridge nested in the work station of the gauge;

FIG. 5 is a plan view of a turntable during a preferred method of cartridge alignment, with an early step of the method shown in full and a later step shown in broken, phantom outline;

FIGS. 6, 7 and 8 are perspective views of the preferred gauge on a turntable with a nested, tone arm-mounted cartridge, during progressive steps of the preferred method;

FIG. 9 is a bottom plan view of the preferred sales case;

FIG. 10 is a broken, exploded, perspective view of the sales case, included to show the key of the case;

FIG. 11 is a partial, upward looking plan view of the case cover;

FIG. 12 is a plan view of an alternate gauge; and

DETAILED DESCRIPTION OF THE PREFERRED EMBODIMENT

Figure 13:
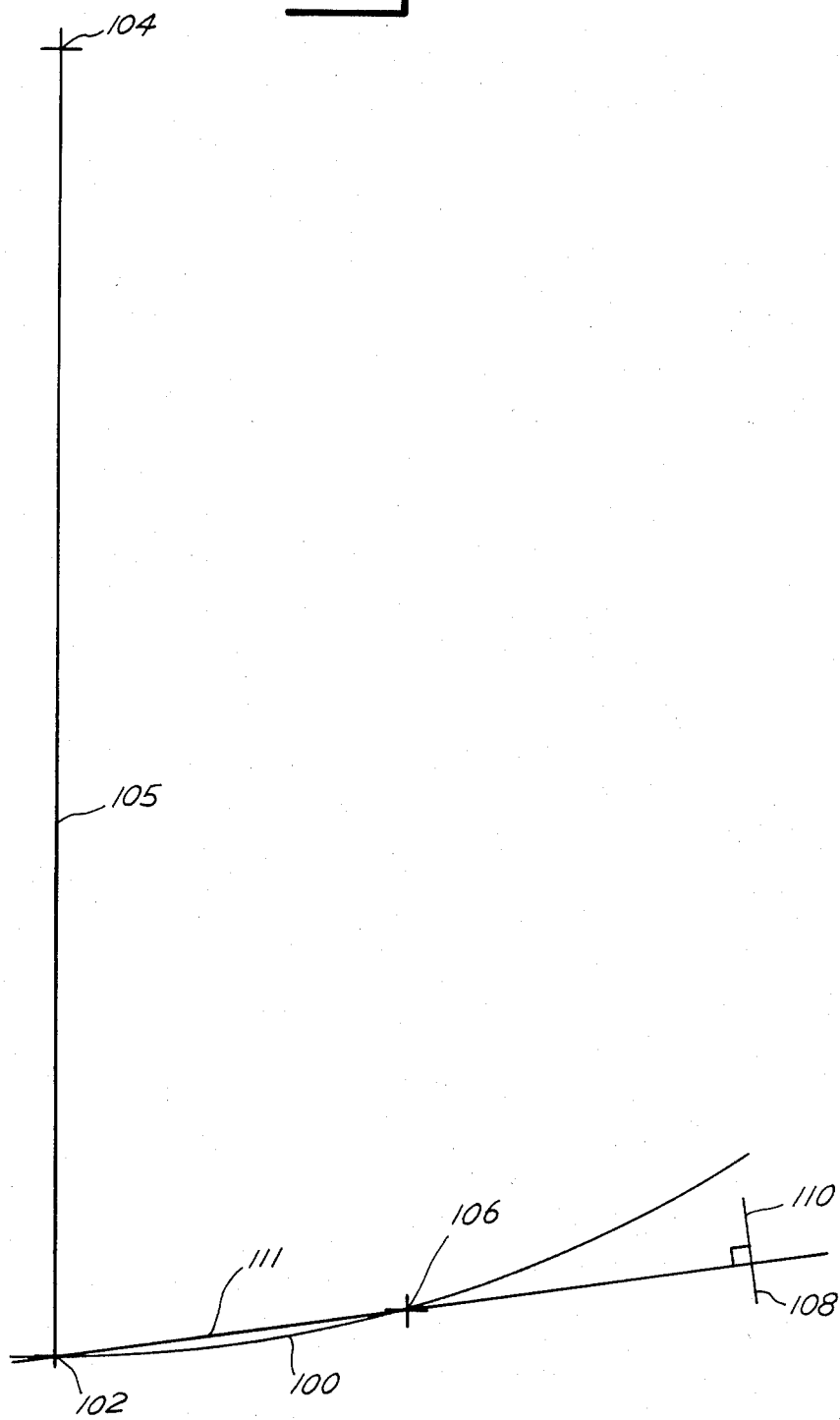
FIG. 13 is a diagram of an alternate method of alignment.

Referring to FIGS. 1, 2, 5–8, 12 and 13, in order, the preferred embodiments of this invention include a preferred sales case 10, a preferred cartridge alignment gauge 12, a preferred method of alignment, an alternate gauge 14 and alternate methods of alignment.

Referring again to FIG. 1, the preferred sales case 10 includes the preferred gauge 12, mounted and locked between a transparent cover 16 and a base 18 by a centrally located key 20. The gauge 12 includes a plate 22, which is planar and generally rectangular, with smoothed corners. The plate 22 fits within a matching, raised rim 24 of the base 18; outward of this first rim 24, the base 18 includes a second rim 26. Like the first rim 24 and gauge plate 22, the second rim 26 is generally rectangular, with smoothed corners. The cover 16 fits about the rim 26, encasing the gauge 12 within the case 10.

The cover 16 includes a generally rectangular, planar top 28 and four side walls 30. In the central portion of the top 28, the cover 16 includes a recessed, circular key mounting area 32. Referring to FIG. 11, the area 32 defines a central key opening 34.

An enlarged head 36 of the key 20 is located in the recessed area 32, and a shaft 38 of the key extends through the opening 34. Atop the head 36, the key 20 includes tabs of buttons 40 for manual rotation of the key 20. As shown best in FIG. 11, this rotation is limited to ninety degrees by cooperating flanges 42 on the recessed area 32 and guides 44 on the key 20.

The gauge 12 includes a generally centrally located bushing 46, which is mounted on the plate 22 through an opening 48, and defines an opening 50 through the plate 22. The opening 50 is a combination pivot-point spindle opening, as will be described, but also receives key shaft 38 when the gauge 12, cover 16 and base 18 are placed together.

The base 18 also includes a generally centrally located opening 52, for the key shaft 38. As in FIG. 10, the key shaft 38 terminates in a keyed tip 54 which is oblong and undercut along its short sides 56. A key retainer clip 58 is mounted on the base bottom, as in FIG. 9, with two legs 60 extending alongside the opening 52. When the tip 54 is passed through the opening 52 and rotated, the clip legs 60 enter the undercuts 62 and retain the tip 54. When the tip 54 is rotated again, opposite the first rotation, the tip 54 is released. The key 20 thereby constitutes a key means for passing through the openings 34, 50, 52 and for releasably locking the cover 16 and gauge 12 to the base 18.

Returning to FIG. 1, the gauge 12 further includes a work station 64 and a stylus mount 66 located on an end 68 of the plate 22. As shown in FIG. 4, the station 64 is a nesting work station in that it is configured such that a cartridge 70 nests in the station 64. The station 64 is also configured for non-nesting mounting of the cartridge 70 as in FIG. 1. The stylus mount 66 provides for the mounting of a stylus 72 on the gauge 12, and is removable, as seen by comparing FIGS. 1 and 2.

The gauge 12 is completed by an arcuate or arc shaped slot 74 defined in the end 76 of the plate 22, and a visual indicator 77 adjacent the slot 74. The slot 74 has a width and the opening 50 has a diameter large enough for snug placement over a turntable spindle 78, as in FIGS. 5, 7 and 8. The arc shaped edges 80, 82 which partially define the slot 74 have a common center of arcuity at the opening 50. The gauge 12 may thus be pivoted about the opening 48, with the spindle within the slot 74.

The work station 64, slot 74, and indicator 77 are precisely located on the plate 22 relative to each other and to the opening 50. As shown in FIG. 3, the cartridge 70 is pivotably and linearly movable relative to a headshell 84 of a tone arm 86. The preferred purpose of the gauge 12 is to position the cartridge 70 on the tone arm 86 such that the shank of a normally mounted stylus 72 is tangent to the record groove or perpendicular to the radius of a turntable-mounted record 88 (FIG. 5) at the following two pre-selected radii, or distances from the center of the spindle: 2.60 inches (66.04 mm) and 4.76 inches (120.90 mm). To achieve this end, the indicator 77 and center of the opening 50 define a line across the plate 22. The work station 64 is positioned on the plate 22 so that an imaginary point representing the tip of a stylus 72 normally mounted on a cartridge 70 nested in the station 64, is on the line defined by the indicator 77 and center of the opening 50.

That is, for any cartridge 70, the normal mounting of a stylus 72 locates the stylus tip at a point. Both by measurement and by experimentation, the location of this point can be determined whether the stylus 72 is actually mounted on the cartridge 70 or not. When the stylus 72 is not on the cartridge 70, the point is an imaginary stylus-tip-representing point. The point is always at the same location relative to the cartridge 70, can be considered a point "of" the cartridge, and "orbits" the cartridge 70 as the cartridge 70 moves, much as a fixed position or geosynchronous communication satellite orbits the earth as it moves. Thus, by measurement or experimentation, locations of the cartridge 70 can be determined such that the stylus-tip-representing point of the cartridge 70 is on the line defined by the indicator 77 and the center of the opening 50. The work station 64 can then be located on the plate 22 such that a cartridge 70 nested in the station 64 is in such a position of alignment.

Alternatively, the station 64 can be randomly located on the plate 22, the stylus-tip-representing point can be determined, and the indicator 77 and slot 74 can be located on the plate 22 so that the stylus-tip-representing point, center of the opening 50 and indicator 77 are on a single, common line. The indicator 77 thus constitutes a means for linearly aligning (i) the point representing the stylus tip, (ii) the center of the combination pivot point-spindle opening 50 and the center of a spindle 78 within the slot 74.

Further to achieve the end of precise mounting of the cartridge 70 on the headshell 84, the work station 64, slot 74, and opening 50 are also located precise distances and angles relative to each other. The work station 64 is positioned on the plate 22 so that the stylus-tip-representing point is a first (2.60 inches) of the two preselected distances from the center of the opening 50, and angled so that an imaginary line representing the stylus shank of a stylus 72 normally mounted on a work station-received cartridge 70 is perpendicular to the line defined by the stylus-tip-representing point and the center of the opening 50. A centerline of the slot 74 located between the edges 80 and 82 of the slot 74 is located on the plate 22 a distance from the center of the opening 50 equal to the difference between the two preselected distances. That is, the inner, arc shaped edge 80, at the point therealong of the indicator 77, is a distance from the center of the opening 50 equal to the difference between the two preselected distances minus half the width of the spindle 78. Thus, the distance from a centerline located midway between the edges 80 and 82 to the stylus-tip-representing point is equal to the second preselected distance (4.76 inches).

The gauge 12 is used in a method of cartridge alignment as follows. First, the sales case 10 is opened and the cover 16, base 18, gauge 12, cartridge 70, stylus 72, and stylus mount 66 separated. A record 88 is then placed on the turntable platter, as in FIG. 5, and the platter immobilized, as by wedges between the platter and turntable base. The gauge 12 is placed on the record 88, with the spindle 78 in the opening 50. The cartridge 70 is loosely fastened to the headshell 84, with some freedom for movement, as in FIG. 3. The cartridge 70 is then nested in the work station, and securely fastened to the headshell 84, as in FIG. 4. The gauge 12 and cartridge 70 then occupy the position shown in full in FIG. 5, and in FIG. 6.

With the first major step of the method of alignment of the cartridge 70 completed, the gauge 12 is lifted, with the cartridge 70 remaining securely fastened to the headshell 84 and nested in the work station 64. The gauge 12 is repositioned with the spindle 78 anywhere in the slot 74, and with the gauge 12 manually held against the record 88, as in FIG. 7. The cartridge 70 is loosened from the headshell 84, with manual pressure continuing. The gauge 12 is then pivoted about the opening 50, as in FIG. 8, until the indicator 77 is centered on the spindle 78. The cartridge 70 is then refastened securely on the headshell 84.

To complete the method of alignment after this second major step of the method, the cartridge 70 is removed from the gauge 12, the gauge 12 is removed from the record 88, the platter is mobilized and the stylus 72 is mounted on the cartridge 70.

Because of the geometry of the gauge 12, the cartridge 70 will be mounted to the tone arm 86 as desired, at the end of this process, without further adjustment.

As should now be apparent, the preferred gauge 12 and a preferred method of cartridge alignment are now fully described. Once the gauge 12 and preferred method are known, a variety of modifications to the gauge and method, and alternative gauges and methods spring to mind. As an example, the gauge 12 could be constructed without the slot 74 and with the arc shaped edge 80 defining the end 76 of the gauge 12. As another example, the gauge 12 could be abbreviated to exclude the edge 80 altogether, with the user left to measure by ruler the desired distance between the opening 50 and spindle 78 for the second major step of the preferred process. As desired, the work station 64 may be shaped and positioned for a specific type cartridge, or shaped and positioned for several or many different types of cartridges.

The case 10 and gauge 12 are made of any desired materials, by any desired manufacturing methods. As most preferred, the case 10 is plastic except for the clip 58 and plate 22, which are metal. The plate 22 is stamped from metal sheet. The bushing 46 is created in two parts which are snapped together through an opening in the plate 22, and the work station is provided with pins which are passed through pin openings in the plate 22 and melted at their tips to form enlarged, retaining pin heads.

The alternate gauge 14 utilizes the basic inventive concept of the gauge 12, but allows the user more freedom for visual adjustment. As shown in FIG. 13, both gauges 12, 14 use the concept that for any given tone arm pivot location, tone arm pivot-to-spindle distance and two preselected radii, a single point and single direction can be located on a platter or platter-mounted record such that if a stylus tip is located on the single point and the stylus shank is aligned with the single direction, the stylus shank will be tangent to the record groove at the two preselected radii. As shown in FIG. 13, the single point and direction are located by sweeping an arc 100 across the platter through the spindle center point 102, with the arc 100 having a center at the tone arm pivot 104 and a radius 105 equal to the tone arm pivot to spindle distance. A reference point 106 is marked along this arc 100 at a distance from the point 102 equal to the difference of the two preselected radii. The single point 108 and direction 110 are then located by drawing a reference line 111 through the points 102, 106; locating the point 108 at the greater preselected radii from the spindle; and locating the direction 110 through the point 108 perpendicular to the line of the points 102, 106, 108.

The gauge 12 uses this concept by locating the opening 50 on the arc 100 through placing the opening 50 on the spindle 78 and securing the gauge 12 and cartridge 70 to the tone arm 86. Movement of the tone arm 86 then sweeps the opening 50 along the arc 100. Placement of the gauge 12 with the spindle 78 in the slot 74 locates the opening 50 at the point 106. Pivoting movement of the gauge 12 about the opening 50 aligns the opening 50 (not over the point 106) with the indicator 77 (at the point 102) and the stylus tip representing point (at the point 108).

The gauge 14 and an alternate method of cartridge alignment use this concept in that the gauge includes a plate 112 defining a spindle opening 114, a visual indicator 115 for positioning the gauge with respect to a line defined by the points 102, 104 and a grid or scale 116 providing a range of points 118, 120, 122 and lines 124, 126, 128 corresponding to a range of tone arm pivot to spindle distances. When the indicator 115 is pointed to the tone arm pivot, the grid 116 places the points 118-122 and lines 124-128 for proper visual alignment of a cartridge and stylus. With the cartridge loosely mounted on the tone arm, the cartridge can be moved relative to the tone arm until the stylus tip (if the stylus is mounted on the cartridge) or a stylus point representing the tip of a mounted stylus is located over the point 118, 120 or 122 appropriate to the turntable, and the shank is aligned with the corresponding line 124, 126 or 128.

The invention, and the manner and process of making and using it, are now described in such full, clear, concise, and exact terms as to enable any person skilled in the art to make and use the same. The best mode contemplated by the inventor of carrying out his invention is set forth.

To particularly point out and distinctly claim the subject matter regarded as invention, the following claims conclude this specification. It is to be understood that while the claims recite details of the phonograph in defining elements of the structural subject matter regarded as invention, the phonograph is the workpiece upon which the subject matter works, and is not a part of the claimed structural subject matter. Therefore, the claims to the alignment gauges are not to be limited to combinations including the phonograph and its components as elements.

What is claimed is:

1. An improved phonograph cartridge alignment gauge for positioning a phonograph cartridge on a pivotally supported tone arm of a phonograph having a turntable platter with a central spindle, such that the shank of a stylus normally mounted on the cartridge will be at a desired angle relative to the groove of a record placed on the turntable platter at two preselected radii from the center of the spindle, thereby adjusting the weighted lateral tracking error for any tone arm pivot-to-spindle distance, comprising:

(a) a plate defining a combination pivot point-spindle opening having a center;
  (b) a work station affixed on the plate and adapted to receive the phonograph cartridge, the work station being positioned on the plate so that a point representing the tip of the stylus normally mounted on the received cartridge is a first of the two preselected radii from the center of the combination pivot point-spindle opening and a first line representing the shank of the stylus normally mounted on the received cartridge is the desired angle relative to a second line defined by the point and the combination pivot point-spindle opening; and
  (c) means on the gauge for linearly aligning (i) the point representing the stylus tip, (ii) the center of the combination pivot point-spindle opening, and (iii) the center of the turntable spindle while the turntable spindle is outside the combination pivot point-spindle opening and is the second preselected radii from the point representing the stylus tip whereby the cartridge may, in a first major step of alignment, be received at the work station, the combination pivot point-spindle opening placed over the spindle, and the cartridge securely mounted to the tone arm, thereby establishing the desired angle at the first of the two preselected radii;

and further whereby the gauge, in a second major step of alignment, may be moved to a position at which the point representing the stylus tip is the second preselected radii from the center of the spindle, the cartridge loosened, the gauge pivoted about the center of the combination pivot point-spindle opening until the point, center of the opening and center of the spindle are aligned, and the cartridge again securely mounted, thereby establishing the desired angle at the second of the two preselected radii while maintaining the desired angle at the first such radii.

2. A phonograph cartridge alignment gauge as in claim 1 for establishing tangency at the two preselected radii to minimize weighted lateral tracking error in which the work station is positioned on the plate so that the first line representing the shank of the stylus normally mounted on the received cartridge is perpendicular to the second line defined by the point and the center of the combination pivot point-spindle opening.

3. A phonograph cartridge alignment gauge as in claim 1 in which the plate further defines an arc shaped edge, the edge having as a center of arcuity the center of the combination pivot point-spindle opening and as its radius of arcuity a distance equal to the difference between the two preselected radii minus half the diameter of the spindle;

whereby the second step of alignment may be accomplished with the spindle abutting the arc shaped edge.

4. A phonograph cartridge alignment gauge as in claim 3 in which the plate further defines an arc shaped spindle opening, an edge of the arc shaped spindle opening being defined by the arc shaped edge;

whereby the second step may be accomplished with the spindle in the arc shaped spindle opening.

5. A phonograph cartridge alignment gauge as in claim 3 or claim 4 in which the linear alignment means includes a pointer visible on the plate adjacent the arc shaped edge.

6. A phonograph cartridge alignment gauge as in claim 1 in which the work station is a nesting work station for nesting of the cartridge without the stylus.

7. A method for using a phonograph cartridge alignment gauge having (a) a plate defining both a combination pivot point-spindle opening and an arc shaped spindle opening, (b) a linear alignment indicator on the plate adjacent the arc shaped spindle opening and (c) a work station, to position the phonograph cartridge on a pivotally supported tone arm of a phonograph having a turntable platter with a spindle at its center, such that the shank of a stylus normally mounted on the cartridge is tangent to the grooves of a record placed on the turntable at two preselected distances from the center of the spindle, thereby minimizing the weighted lateral tracking error for any tone arm pivot to spindle distance, the method comprising the steps of:

(a) immobilizing the turntable platter;
  (b) placing the gauge over the turntable platter with its combination opening positioned on the spindle;
  (c) placing the cartridge in the work station;
  (d) fastening the cartridge securely to the tone arm;
  (e) lifting the gauge off the spindle with the cartridge still in the nesting work station;
  (f) placing the gauge back over the turntable platter with the arc shaped spindle opening positioned on the spindle;
  (g) holding the gauge over the turntable platter by maintaining the position of the combination opening;
  (h) loosening the cartridge from the tone arm;
  (i) rotating the gauge about the combination pivot point-spindle opening until the linear alignment indicator indicates linear alignment of the spindle, the center of the combination opening and a point representing the tip of a stylus normally mounted on the cartridge;
  (j) refastening the cartridge securely to the tone arm; and
  (k) removing the cartridge from the nesting work station.

8. A method for positioning a phonograph cartridge on a pivotally supported tone arm of a phonograph having a turntable with a spindle at its center such that the shank of a stylus normally mounted on the cartridge is tangent to the grooves of a record placed on the turntable at two preselected distances from the center of the spindle thereby minimizing the weighted lateral tracking error for any tone arm pivot-to-spindle distance, the method comprising the steps of:

(a) defining an arc which has as a center the tone arm pivot and as a radius the distance between the tone arm pivot and the center of the spindle;
(b) defining a reference point on the arc at a distance from the center of the spindle equal to the difference between the two preselected distances;
(c) defining a reference line through the reference point and the center of the spindle;
(d) mounting the cartridge loosely on the tone arm;
(e) positioning the cartridge such that a shank line representing the shank of the stylus normally mounted on the cartridge is perpendicular to the reference line while the point representing the tip of the stylus is located over the reference line at a distance from the center of the spindle equal to the smaller of the two preselected distances;
(f) rotating the cartridge about the reference point at a distance from the reference point equal to the smaller of the two preselected distances until the stylus tip is located over the reference line defined and is at a distance from the center of the spindle equal to the greater of the two preselected distances; and
(g) mounting the cartridge securely on the tone arm.

9. A method for positioning a phonograph cartridge on a pivotally supported tone arm of a phonograph having a turntable with a spindle at its center such that the shank of a stylus normally mounted on the cartridge is tangent to the grooves of a record placed on the turntable at two preselected distances from the center of the spindle thereby minimizing the weighted lateral tracking error for any tone arm pivot-to-spindle distance, the method comprising the steps of:
(a) defining an arc which has as a center the tone arm pivot and as a radius the distance between the tone arm pivot and the center of the spindle;
(b) defining a reference point on the arc at a distance from the center of the spindle equal to the difference between the two preselected distances;
(c) mounting the cartridge loosely on the tone arm;
(d) positioning the cartridge until a stylus point representing the tip of the stylus normally mounted on the cartridge is located over a reference line defined by the reference point and the spindle and is at a distance from the center of the spindle equal to the greater of the two preselected distances;
(e) rotating the cartridge about the stylus point until a line representing the shank of the stylus is perpendicular to the reference line; and
(f) mounting the cartridge securely to the tone arm.

* * * * *